US007020968B1

(12) United States Patent
Abdel-Dayem

(10) Patent No.: US 7,020,968 B1
(45) Date of Patent: Apr. 4, 2006

(54) FRUIT AND VEGETABLE CORING MACHINE

(76) Inventor: Bassam A. Abdel-Dayem, 4455 Lancero Ct., Fremont, CA (US) 94536

( * ) Notice: Subject to any disclaimer, the term of this patent is extended or adjusted under 35 U.S.C. 154(b) by 0 days.

(21) Appl. No.: 10/666,066

(22) Filed: Sep. 18, 2003

(51) Int. Cl.
*A47J 25/00* (2006.01)

(52) U.S. Cl. .................................. 30/113.1; 30/113.3

(58) Field of Classification Search .............. 30/113.1, 30/113.3, 279.2, 314; 426/481–485; 99/542–565; D7/693–696
See application file for complete search history.

(56) References Cited

U.S. PATENT DOCUMENTS

| 561,860 | A | * | 6/1896 | Bringham ..................... 30/315 |
| 911,828 | A | * | 2/1909 | Mack ........................ 30/113.3 |
| 1,374,289 | A | * | 4/1921 | Dunkley ..................... 30/113.1 |
| 2,683,312 | A | | 7/1954 | Dover |
| 3,063,685 | A | | 11/1962 | Rommel |
| 3,292,679 | A | * | 12/1966 | Roth ........................... 99/593 |
| 3,754,470 | A | * | 8/1973 | Console ....................... 99/538 |
| 3,780,435 | A | * | 12/1973 | Farha et al. ................ 30/113.1 |
| 4,453,458 | A | * | 6/1984 | Altman ........................ 99/544 |
| 4,456,075 | A | * | 6/1984 | Hostetter ..................... 30/310 |
| 4,596,073 | A | * | 6/1986 | Ewald ........................ 30/113.1 |
| 5,088,782 | A | * | 2/1992 | Scott ............................ 294/5 |
| 5,102,678 | A | * | 4/1992 | Plant et al. .................. 426/481 |
| 5,435,238 | A | * | 7/1995 | Paterson et al. .............. 99/564 |
| 5,582,571 | A | * | 12/1996 | Simpson et al. ............ 493/355 |
| 5,676,464 | A | | 10/1997 | Mattar |
| 5,699,725 | A | | 12/1997 | Poltielov |
| 5,852,875 | A | | 12/1998 | Dolah |
| 6,199,283 | B1 | | 3/2001 | Bryant |
| 6,267,036 | B1 | * | 7/2001 | Lani ............................. 83/660 |
| RE37,321 | E | | 8/2001 | Poltielov |
| 6,295,681 | B1 | | 10/2001 | Dolah |
| 2001/0019732 | A1 | | 9/2001 | Roussel et al. |
| 2003/0217650 | A1 | * | 11/2003 | Herrera ....................... 99/547 |
| 2004/0187662 | A1 | * | 9/2004 | Ulmer et al. ................. 30/314 |

\* cited by examiner

*Primary Examiner*—Stephen Choi
(74) *Attorney, Agent, or Firm*—Rick Martin; Patent Law Offices of Rick Martin, P.C.

(57) ABSTRACT

A coring tool is designed to first pierce the skin of a fruit and/or vegetable such as a pepper. A second phase blade of the coring tool preferably has a pair of oval blades, each with a sharpened leading edge to core the inside of the pepper. Thus, the two phase tool allows the user to easily cut through the skin of the pepper making a small. Neat hole, and then push the tool further into the center of the pepper, thereby coring the center. A hand held stirrer is shown powering the coring tool.

2 Claims, 5 Drawing Sheets

FRUIT AND VEGETABLE CORING MACHINE

FIELD OF INVENTION

The present invention relates to a hand held mixer with a blade that cores foodstuffs including vegetables and fruits.

BACKGROUND OF THE INVENTION

Cooks have used manual vegetable and fruit coring implements for years to hollow out peppers, tomatoes, pears, apples, and other vegetables and fruits. A minimal mutilation of the flesh of the vegetable or fruit is desirable.

A brief summary of hand held and rechargeable battery powered devices follows below.

U.S. Pat. No. 2,583,577 (1952) to Kingsbury discloses a manually rotated coring tool.

U.S. Pat. No. 2,683,312 (1954) to Dover discloses a manual fruit coring tool.

U.S. Pat. No. 3,063,685 (1962) to Rommel discloses an egg beater type mixing head.

U.S. Pat. No. 3,780,435 (1973) to Farha et al. discloses an electric corer with a guide. Various cutting heads include a simple oval, a triple oval and a figure eight. The blade is sized to work with the guide to produce a shell of substantially uniform thickness.

U.S. Pat. No. 5,676,464 (1997) to Mattar discloses a set of interchangeable stirring and coring implements, wherein the coring implements resemble drill bits.

U.S. Pat. No. 5,699,725 (1997) and U.S. RE37,321 E (2001) to Poltielov disclose an apple coring tool and a power tool rasp bit.

U.S. Pat. No. 5,852,875 (1998) to Dolah discloses a battery powered motor/handle for moving a coring knife and brushes.

U.S. Pat. No. 6,199,283 B1 (2001) to Bryant discloses a manually rotated vegetable/fruit coring tool that has two fork like projections.

U.S. Pat. No. 6,295,681 B1 (2001) to Dolah discloses a rotary brush cleaning device.

U.S. Pat. App. Pub. No. 2001/0019732 A1 (2001) to Roussel discloses a food product method using dies and needles.

None of the cutting heads have a first skin piercing blade followed by a second coring blade consisting of a pair of ovals. The present invention teaches various multi-blade coring heads to first pierce the skin and then minimize the mutilation of the pulp, all powered by a hand held stirrer.

SUMMARY OF THE INVENTION

The main aspect of the present invention is to provide a two phase unique cutting head(s) for a powered coring machine.

Another aspect of the present invention is to provide a hand held stirrer to power the coring heads and/or to power a conventional egg beater type stirring head.

Stuffing a vegetable or a fruit is as easy as 1-2-3 with the present invention which is two machines in one. The present invention is a hollower and a mixer. It is an electrical and held device with an easy grip to let you tackle some of the toughest and most fragile jobs with ease. It is lightweight with different variations of speed in order to give you control of the task that you are doing. The hollower will hollow out any kind of vegetables or fruits. Stuffing tomatoes, potatoes, squash carrots, or apples will be simplified with the dual cutting head. The hollower will do the work for you, all you have to do is control how much you want to hollow out the vegetable or fruit.

The mixer will mix your cake batter, pancake batter or whatever job that needs mixing. The mixer will do the job for you according to the speed you want. The present invention is ideal for any person, whether you are a professional chef or cooking for your home, it will make cooking and stuffing easier.

The present invention consists of an electronic motor enclosed in a plastic case. The preferred motor uses an AC/DC wall socket converter to power a DC motor; and has a variable speed switch to set the motor speed to the desirable speed to operate the machine. The drill tip is a unique tip especially designed to make holes in vegetables and fruits, it could come in different sizes to accommodate different size fruits and vegetables. A mixer tip can be interchangeable with the hollower tip.

Other aspects of this invention will appear from the following description and appended claims, reference being made to the accompanying drawings forming a part of this specification wherein like reference characters designate corresponding parts in the several views.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
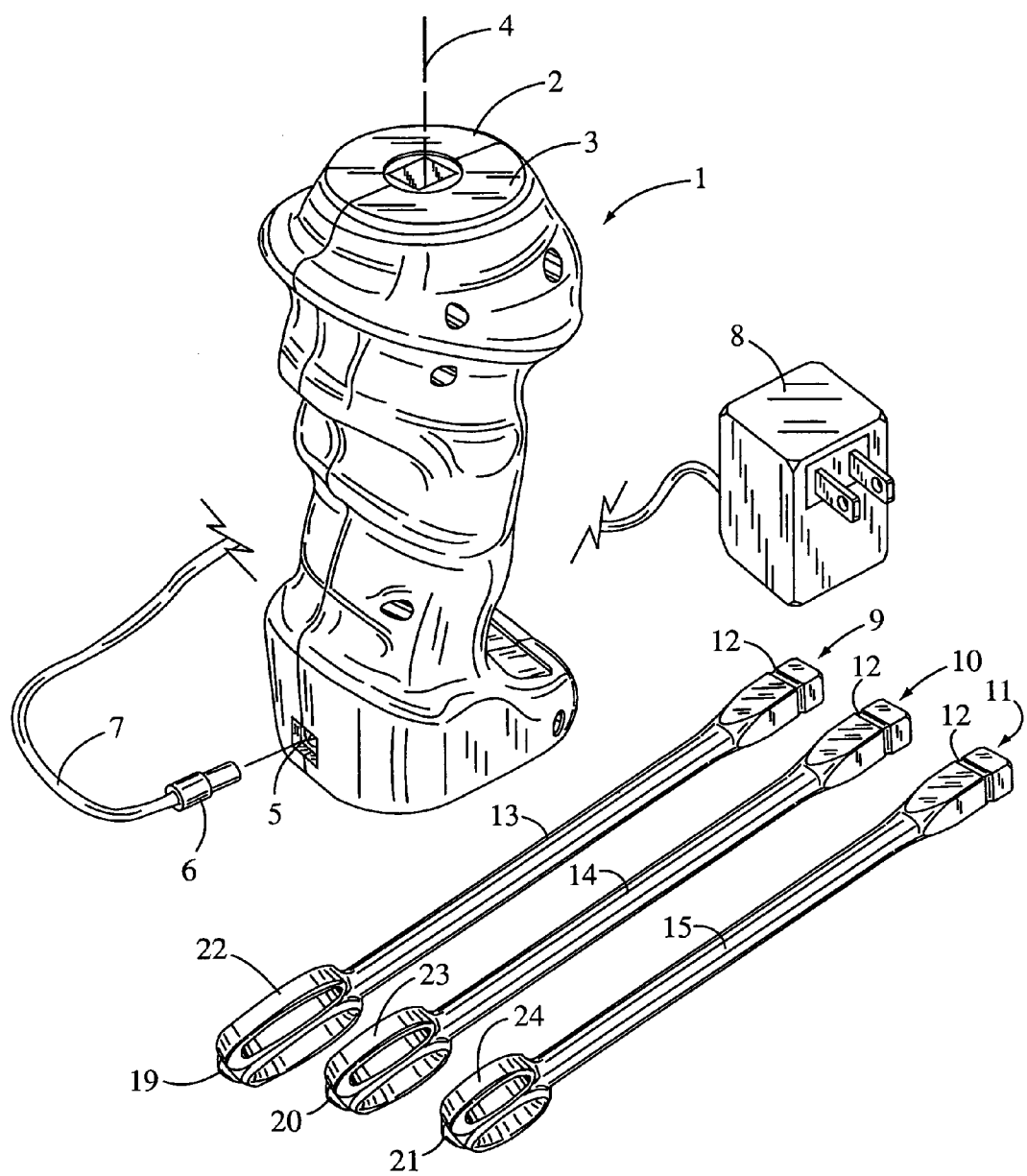
FIG. 1 is an exploded view of the stirrer, the power converter and the preferred blades which are built in three sizes.

Referring first to FIG. 1 a stirrer 1 consists of handle halves 2,3 and a driving socket 4. the driving socket 4 receives the mounting end 12 of various blades including the small corer 11, medium corer 10, and large corer 9. A standard eggbeater (not shown) would have a mounting end 12 to fit into the driving socket 4.

The AC/DC converter 8 plugs into an AC wall socket and sends a DC voltage to the power receiving socket 5 via wire 7 and male plug 6.

Each corer 9,10,11 has a shaft 13,14,15 of a particular length and a coring head, also called a pair of coring ovals 22,23,24 of a particular size to accommodate various sizes of fruits and vegetables.

Each coring head 16,17,18 has a two phase blade consisting of a piercing point 19,20,21 and a pair of coring ovals 22,23,24.

Figure 2:
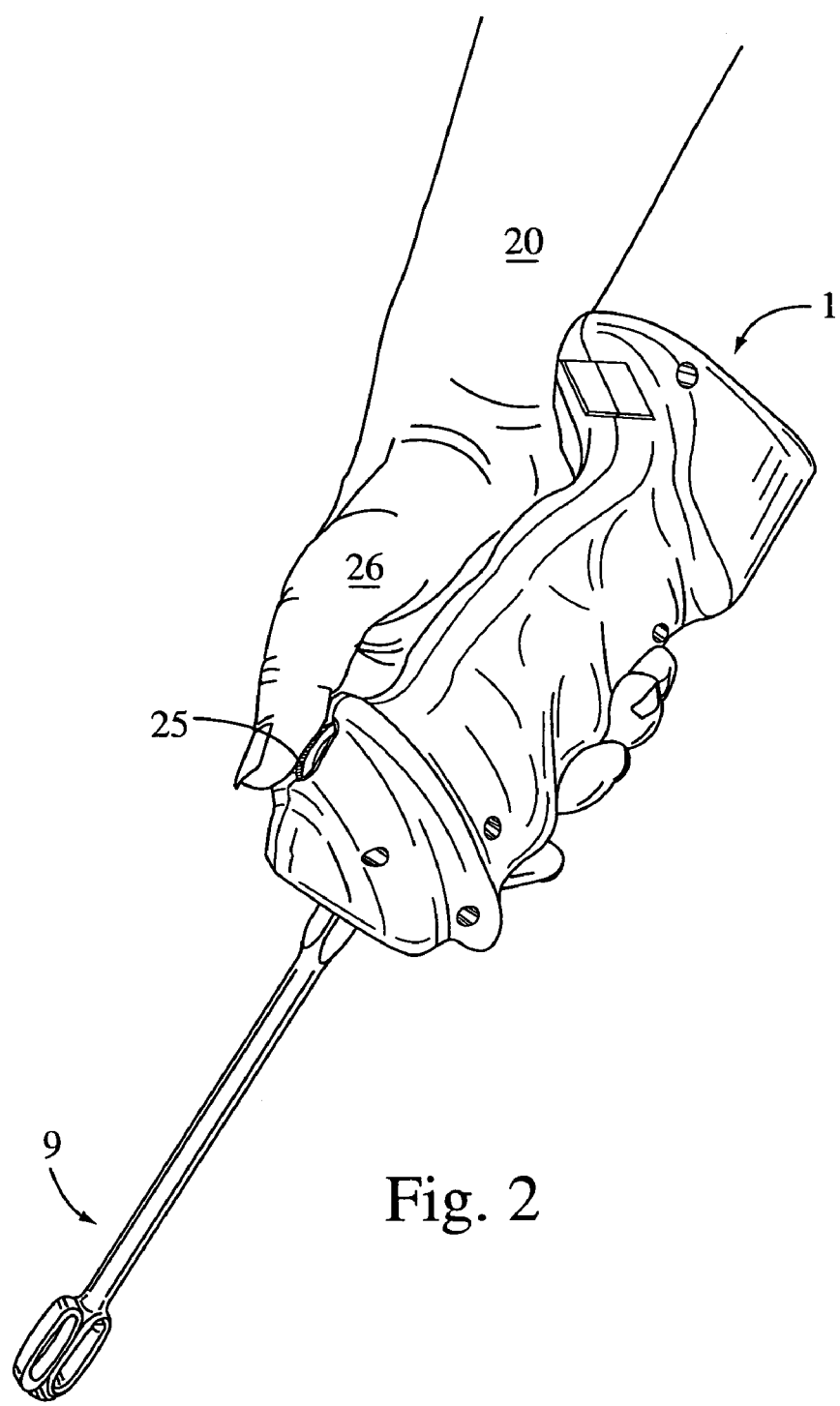
FIG. 2 is a top perspective view of the stirrer with the preferred coring blades mounted therein.

Referring next to FIG. 2 the variable speed and ON/OFF dial 25 is controlled by the user 20 with his thumb 26.

Figure 3:
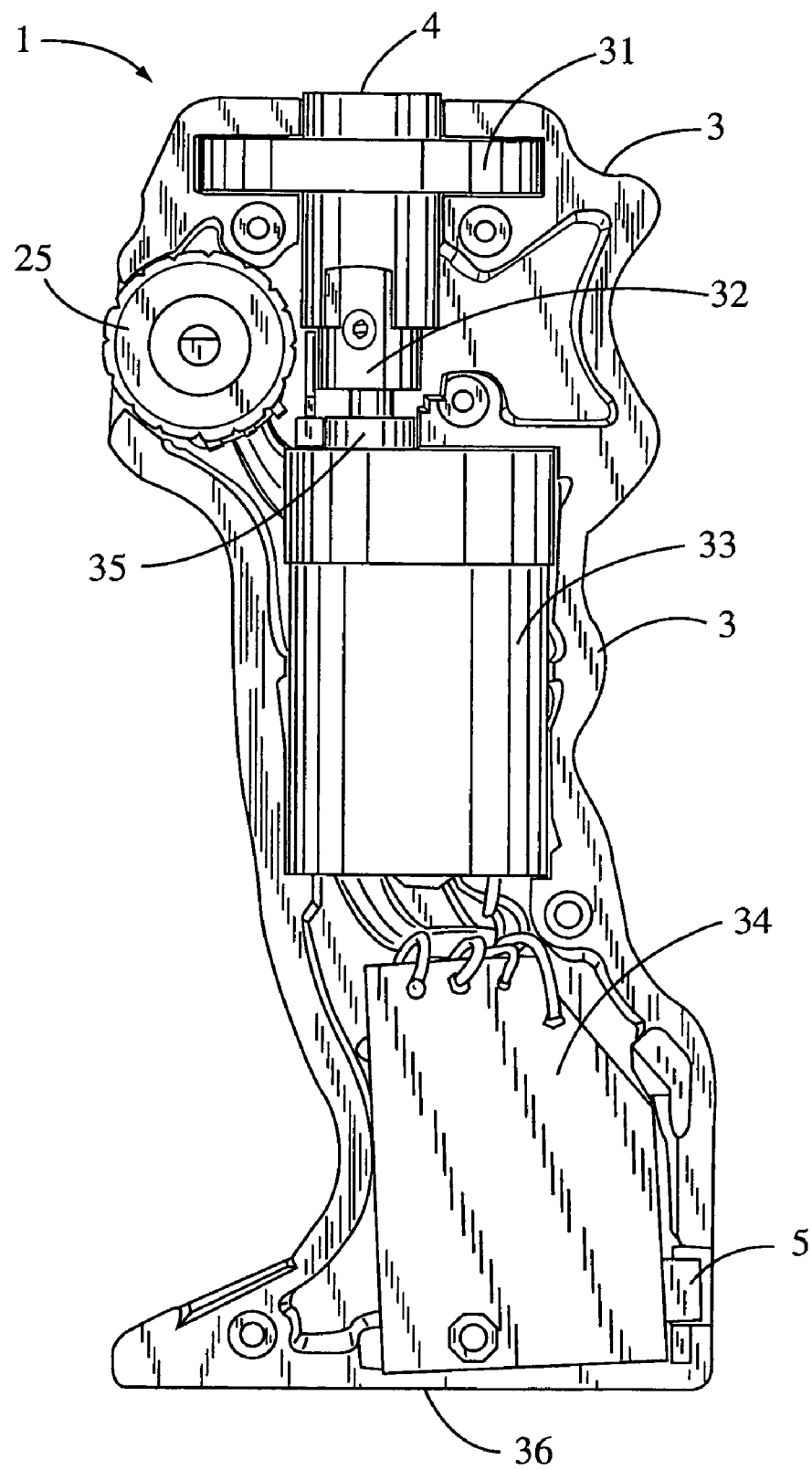
FIG. 3 is a side plan view of the stirrer with a side panel of the handle removed.

Referring next to FIG. 3 the stirrer 1 is shown with handle half 2 removed. The base 36 allows the stirrer 1 to stand on a flat surface. The various blades can be conveniently mounted in driving socket 4.

The electronic control board 34 controls the variable speed motor 33. A nut 35 fastens a step down gear assembly 32 to the motor 33. A spindle 31 supports the receiving socket 4 and rotates therewith.

Figure 4:
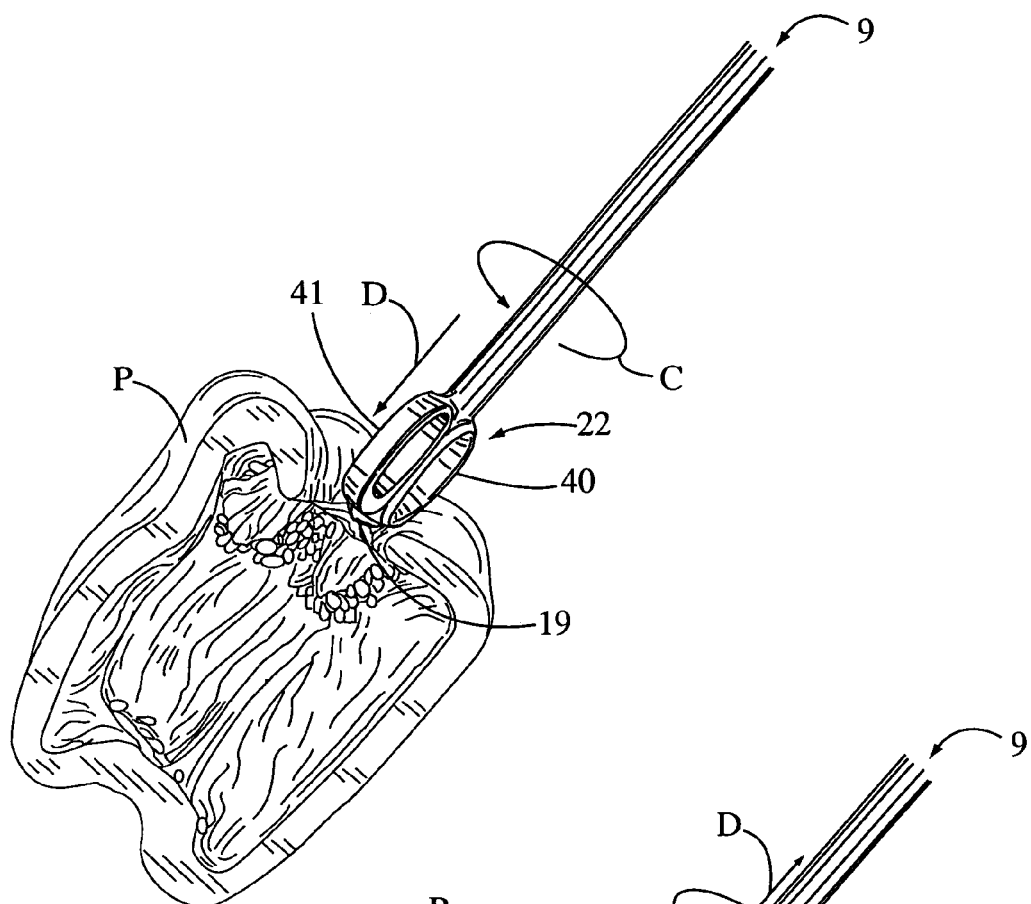
FIG. 4 is a side perspective view of a cross sectioned pepper with the first phase of the preferred coring blade piercing the shell of the pepper.
Figure 5:
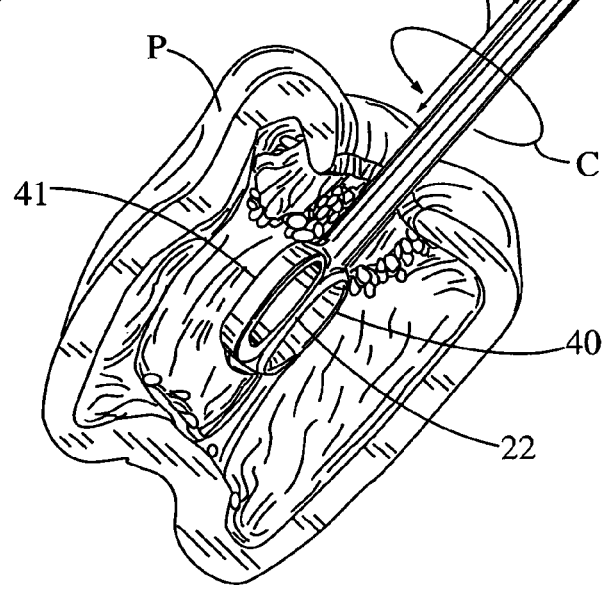
FIG. 5 is the same view as FIG. 4 with the coring blade coring the pepper.

Referring next to FIGS. 4, 5 the pair of coring ovals 22 of large corer 9 is coring a pepper P. The corer 9 rotates in direction C, and the thin, narrow point 19 first pieces the top shell of pepper P, as seen in FIG. 4. Next the leading edges 40,41 of the pair of coring ovals 22 are sharp. These leading edges 40,41 core the inside of pepper P, as seen in FIG. 5, as the corer 9 is pushed in direction D into the Pepper P.

Figure 6:
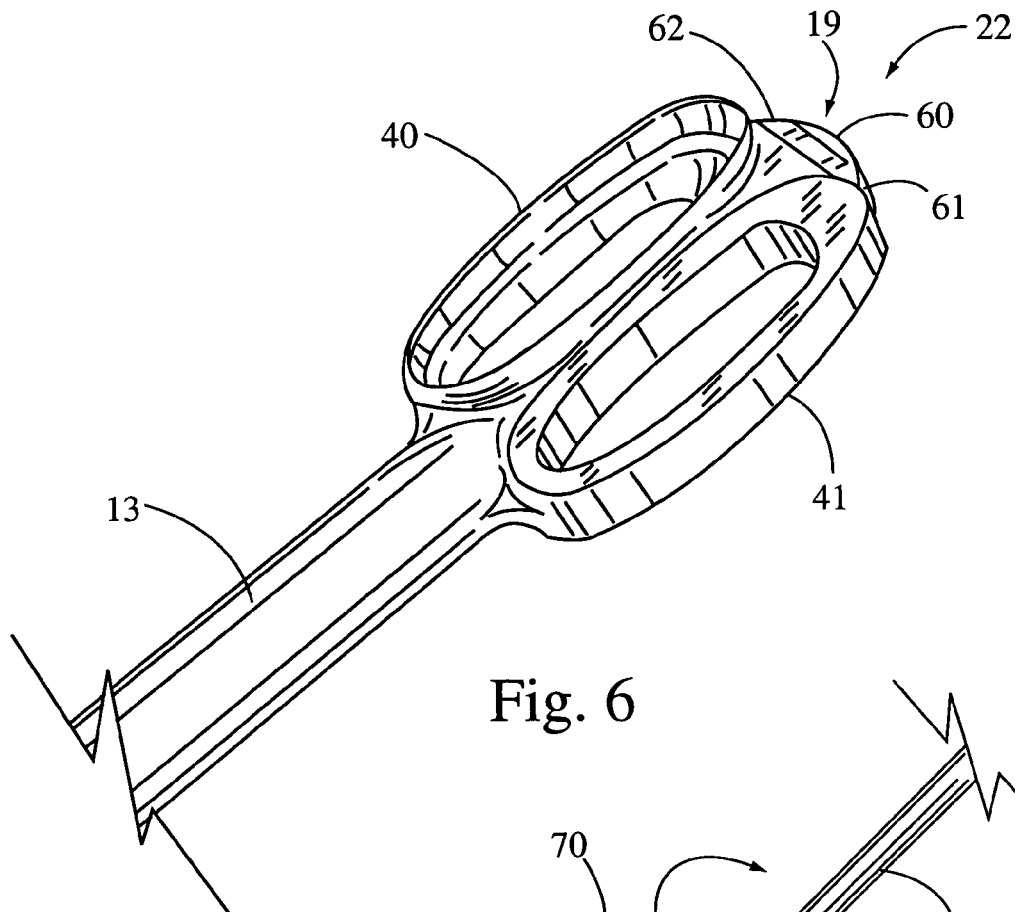
FIG. 6 is a close up view of the preferred coring blade.

Referring next to FIG. 6 the pair of co-planar coring ovals 22 is the preferred embodiment of the phase 2 coring process, but equivalents include a single coring oval or more then two coring ovals. Also equivalents to an oval include a circle. The essential inventive step of the present invention is a phase 1 piercing point 19 which pierces the skin of a food item before the phase 2 coring element enters the food item. The preferred embodiment of piercing point 19 includes a blade having a narrow center portion 60 which tapers outward to wider edges 61,62.

Figure 7:
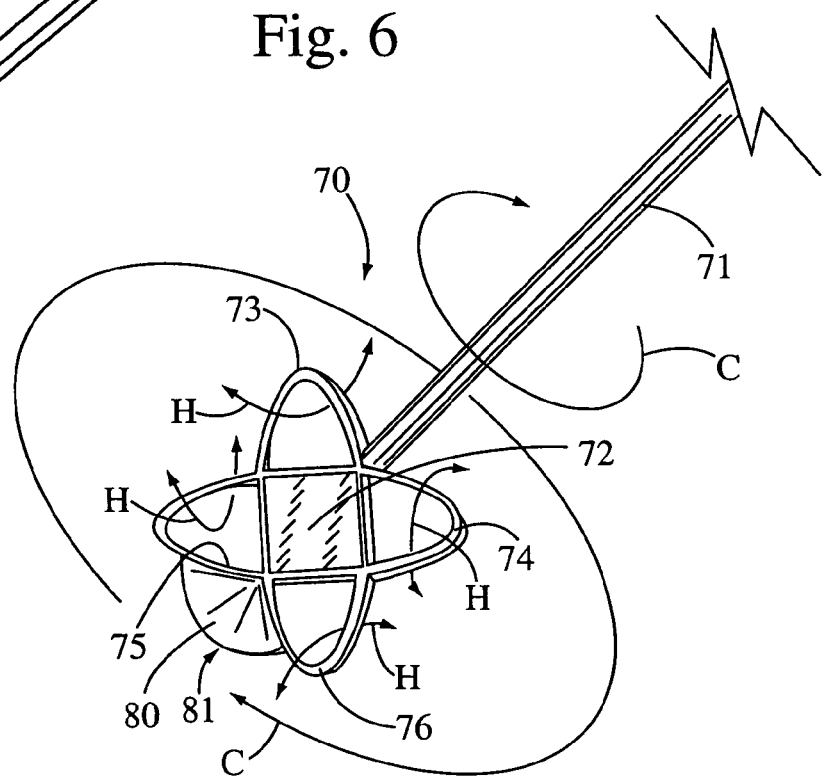
FIG. 7 is a close up view of an alternate embodiment coring blade.

Referring next to FIG. 7 an alternative embodiment coring head 70 has a shaft 71 which rotates in direction C. The phase 1 piercing function is performed by piercing point 80, which is preferable thinner at its midpoint 81. The base 72 is preferably solid for support of the two ovals 73,74. The leading edges 75,76 are thin in order to perform the phase 2 coring function.

Although the present invention has been described with reference to preferred embodiments, numerous modifications and variations can be made and still the result will come within the scope of the invention. No limitation with respect to the specific embodiments disclosed herein is intended or should be inferred. Each apparatus embodiment described herein has numerous equivalents.

I claim:

1. A coring tool comprising:

a hand held stirrer having an electrically powered turning socket;

wherein the hand held stirrer comprises a flat base functioning to allow the hand held stirrer to stand on a flat surface;

a manually interchangeable set of shafts, each shaft having a proximal end with a fitting for receipt by the turning socket;

said shafts having a distal end with a two phase cutter;

a first phase cutter of the two phase cutter comprising a skin piercing blade protruding beyond a second phase cutter;

said second phase cutter comprising a blade having an elongate sharpened leading edge which has a width greater than a width of the first phase cutter;

wherein the second phase cutter further comprises a first oval blade containing the elongate sharpened leading edge;

wherein the second phase cutter further comprises a second oval blade, co-planar with the first oval blade, containing a second elongate sharpened leading edge; and wherein the first phase cutter further comprises a flat blade having a thin, rounded center tapering to a thicker first end and a thicker second end, and having the thin, rounded center protrude further distally than the first and second ends.

2. A coring tool comprising:

a two phase blade connected to a shaft having a proximal connection end for a hand held powered stirrer;

wherein the shaft is manually connectable to the hand held powered stirrer;

wherein the hand held powered stirrer comprises a flat base functioning to allow the hand held powered stirrer to stand on a flat surface;

said two phase blade having a first phase blade comprising a skin piercing member located furthermost distally from the proximal connection end, and having a second phase blade comprising a coring member with a sharpened leading edge;

said coring member having an oval body disposed behind the skin piercing member;

wherein the oval body further comprises a duplicate set of side by side, co-planar, hollow oval bodies, each having a sharpened leading edge; and the skin piercing member further comprises an elongate blade having thicker edges tapering down to a thin rounded central blade area.

* * * * *